(12) United States Patent
Chen et al.

(10) Patent No.: US 7,965,479 B2
(45) Date of Patent: Jun. 21, 2011

(54) OVER-CURRENT AND OVER-VOLTAGE PROTECTION ASSEMBLY APPARATUS

(75) Inventors: Pao Hsuan Chen, Taoyuan (TW); Ching Han Yu, Hualien (TW); Tong Cheng Tsai, Tainan (TW)

(73) Assignee: Polytronics Technology Corporation (TW)

( * ) Notice: Subject to any disclaimer, the term of this patent is extended or adjusted under 35 U.S.C. 154(b) by 800 days.

(21) Appl. No.: 11/857,839

(22) Filed: Sep. 19, 2007

(65) Prior Publication Data
US 2008/0100981 A1    May 1, 2008

(30) Foreign Application Priority Data
Nov. 1, 2006   (TW) ............................... 95219286 U

(51) Int. Cl.
*H02H 3/00* (2006.01)

(52) U.S. Cl. ............ 361/55; 361/111; 361/119; 361/56; 361/57; 361/106; 361/54

(58) Field of Classification Search .................... 361/55, 361/111, 119, 56, 57, 106, 54
See application file for complete search history.

(56) References Cited

U.S. PATENT DOCUMENTS

| | | | | |
|---|---|---|---|---|
| 4,394,639 A * | 7/1983 | McGalliard | .................. | 337/292 |
| 4,586,104 A * | 4/1986 | Standler | ........................ | 361/119 |
| 4,979,067 A * | 12/1990 | Foley | .............................. | 361/18 |
| 5,229,909 A * | 7/1993 | Tessmer et al. | ................. | 361/104 |
| 5,327,318 A * | 7/1994 | Popat et al. | ...................... | 361/55 |
| 5,408,379 A * | 4/1995 | Oguchi et al. | ................... | 361/55 |
| 6,040,972 A * | 3/2000 | Takeuchi | ....................... | 361/119 |
| 6,510,032 B1 * | 1/2003 | Whitney | ........................ | 361/111 |
| 6,982,859 B1 * | 1/2006 | Whitney | ........................ | 361/111 |
| 7,180,719 B2 * | 2/2007 | Whitney | ........................ | 361/119 |
| 7,236,342 B2 * | 6/2007 | Vazach et al. | ................. | 361/119 |
| 7,616,420 B2 * | 11/2009 | Slater et al. | ................... | 361/91.1 |
| 2002/0024791 A1 * | 2/2002 | Whitney et al. | ............... | 361/119 |

* cited by examiner

*Primary Examiner* — Patrick Salce
(74) *Attorney, Agent, or Firm* — Seyfarth Shaw LLP

(57) ABSTRACT

An over-current and over-voltage protection assembly apparatus including an over-current protection (OCP) device and an over-voltage protection (OVP) device is provided. One end of the OCP device is electrically connected to a first connection point, and the other end is electrically connected to a second connection point. One end of the OVP device is electrically connected to a third connection point, and the other end is electrically connected to the second connection point. The second connection point is a common point. The OCP device and the OVP device are modularized and integrated to an assembly. The first, second, and third connection points are connected to an external circuit to be protected, such that the OCP device is connected in series to the circuit to be protected, and the OVP device is connected in parallel to the circuit to be protected.

20 Claims, 5 Drawing Sheets

OVER-CURRENT AND OVER-VOLTAGE PROTECTION ASSEMBLY APPARATUS

BACKGROUND OF THE INVENTION (A) Field of the Invention

The present invention relates to an over-current and over-voltage protection apparatus, and more particularly to an over-current and over-voltage protection assembly apparatus.

(B) Description of the Related Art

Telecommunications systems have become indispensable in modern daily life, as signal transmissions of telephone, networks, and other wireless communications rely heavily on telecommunications systems. Generally, conductors such as metals are used in telecommunications systems for transmitting signals, so systems may be damaged by lightning strikes. In addition to high current, lightning strikes often generate high voltages that are so damaging to telecommunication systems. Therefore, any protection apparatus applied to telecommunication systems must have both over-current protection (OCP) and over-voltage protection (OVP) characteristics.

Voltage resistances of conventional positive temperature coefficient (PTC) devices are quite sensitive to variations in temperature. When the PTC device operates in a normal state, the resistance remains extremely low, such that the circuit operates normally. However, when over-current or over-temperature occurs, the temperature rise to a threshold value causes an instant change to a high-resistance state (e.g., over $10^4$ ohm), so as to offset the over-current. Thus, the objective to protect batteries or circuit devices can be achieved.

Generally, PTC devices can be classified into two categories, namely, polymeric PTC (PPTC) and ceramic PTC (CPTC). The PPTC and CPTC both have superior high-current resistance, and are often used as OCP devices.

In addition, varistors and gas discharge tubes are normally in a high-resistance state. When an over-voltage occurs, the varistors or gas discharge tubes will change to a low-resistance state instantly, such that the voltage is grounded. Varistors and gas discharge tubes can withstand high voltages, and thus are often used as OVP devices.

Protection apparatus of telecommunications devices are mainly implemented by integrating OCP and OVP devices. Conventionally, the OCP and OVP devices are independent devices, and must be connected with a plurality of hardware devices and covered by plastic members for fixing and insulating protection. In addition, an LED can be serially connected for indicating signal output in abnormal states, such as an over-current or an over-voltage. Though the protection apparatus manufactured with the conventional method is simple in structure and low in cost, the protection apparatus requires much time to assemble, and the volume is too large. Therefore, the conventional protection apparatus is not suitable for electronic devices that are miniaturized.

Moreover, current OCP and OVP devices also can be analog power ICs fabricated by semiconductor techniques. However, the process is complicated, and the cost is very high; thus these are not suitable for general consumer electronic product applications.

SUMMARY OF THE INVENTION

The present invention provides an over-current and over-voltage protection assembly apparatus, which integrates and modularizes OCP and OVP devices that have previously been independent. The over-current and over-voltage protection assembly apparatus has advantages of high power resistance, simple process, low cost, and small volume and is very convenient to use, so it is suitable for telecommunications devices.

The over-current and over-voltage protection assembly apparatus comprises an OCP device and an OVP device. One end of the OCP device is electrically connected to a first connection point, and the other end is electrically connected to a second connection point. One end of the OVP device is electrically connected to a third connection point, and the other end is electrically connected to the second connection point. The second connection point is a common point. The OCP and OVP devices are modularized and integrated to be in the form of an assembly. The first, second, and third connection points are connected to an external circuit to be protected, the OCP device is connected in series to the circuit to be protected, and the OVP device is connected in parallel to the circuit to be protected.

Preferably, the OCP device and the OVP device are formed in the assembly by semiconductor packaging (e.g., TO-220 or TO-263), and three pins are brought out of the package and serve as the first, second, and third connection points, respectively.

Moreover, the OCP and OVP devices can also be in the form of a surface mount device (SMD) or a chip, and the OCP device and the OVP device are connected to the connection points with bonding pads or bonding wires.

The over-current and over-voltage protection assembly apparatus has advantages of high power resistance, simple process, low cost, and small volume as compared with the conventional art. The OCP and OVP devices are modularized, which can substantially reduce assembly time compared with the conventional art and is more convenient in practice.

DETAILED DESCRIPTION OF THE INVENTION

Figure 1A:
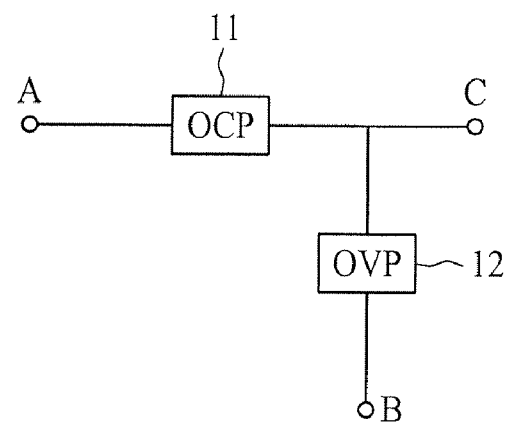
FIGS. 1(a)-1(c) are schematic circuit diagrams of an over-current and over-voltage protection assembly apparatus in accordance with the present invention.

FIG. 1(a) is a schematic circuit diagram of an over-current and over-voltage protection assembly apparatus of the present invention. The over-current and over-voltage protection assembly apparatus includes an OCP device 11 and an OVP device 12. The OCP device 11 is connected in series to the circuit to be protected, and the OVP device 12 is connected in parallel to the circuit to be protected. The connection points are indicated by A, B, and C respectively, and the connection point C connects the OCP device 11 and the OVP device 12 in parallel, and serves as a common point.

Figure 1B:
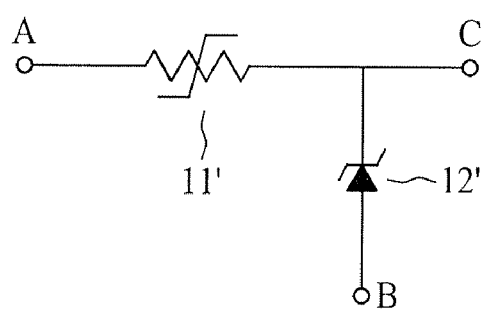
Figure 1C:
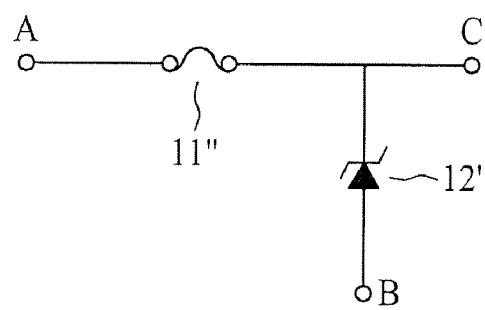

The OCP device 11 can be a PPTC device 11', and the OVP device 12 can be a Zener diode, as shown in FIG. 1(b). Moreover, the OCP device 11 can also be a fuse 11", as shown in FIG. 1(c).

Figure 2:
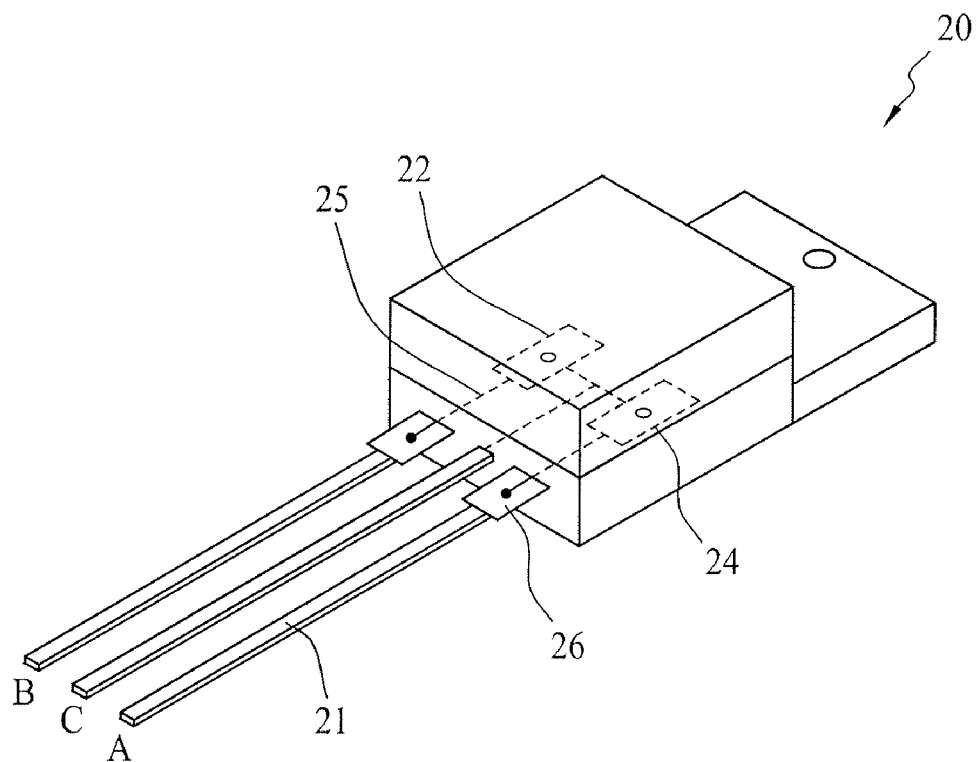
FIGS. 2 and 3 illustrate an over-current and over-voltage protection assembly apparatus in the package form in accordance with the present invention.
Figure 3:
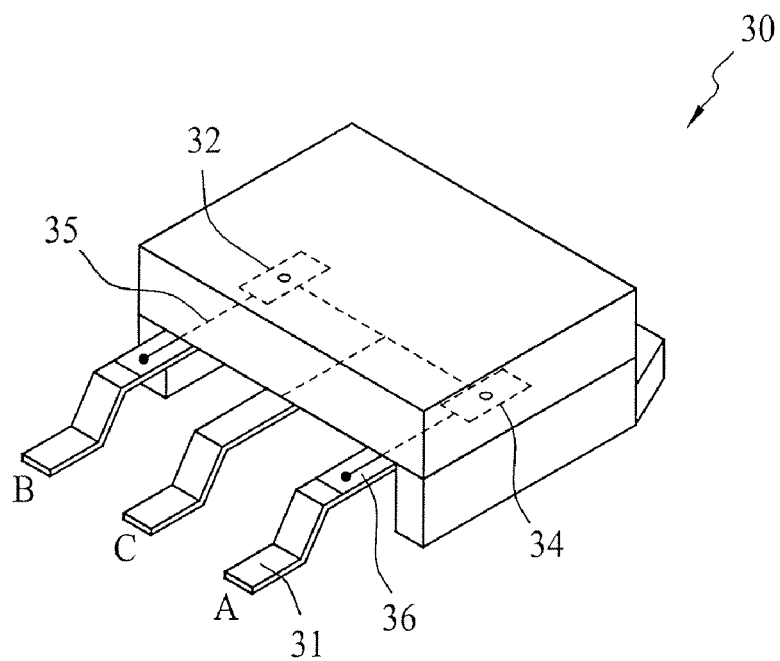

FIGS. 2 and 3 show an over-current and over-voltage protection assembly apparatus fabricated with a known package technique. The over-current and over-voltage assembly protection apparatus of FIG. 2 uses a TO-220 semiconductor package technique. An OVP device 22 and an OCP device 24 are packaged in a manner of TO-220, and are electrically connected to the common point C. Moreover, the OVP device 22 and the OCP device 24 are connected to a bonding pad 26 on a pin 21 through bonding wires 25, so as to form an over-current and over-voltage protection assembly apparatus 20. As shown in FIG. 2, the connection points A, B, and C on the pin 21 correspond to the connection points A, B, and C of FIG. 1(a), and can be used after being connected properly.

FIG. 3 illustrates an over-current and over-voltage protection assembly apparatus according to the second embodiment of the present invention, in which a TO-263 semiconductor package technique is used. An OVP device 32 and an OCP device 34 are packaged in a manner of TO-263, and are electrically connected to the common point C. Moreover, the OVP device 32 and the OCP device 34 are electrically connected to a bonding pad 36 on a pin 31 through bonding wires 35, so as to form an over-current and over-voltage protection assembly apparatus 30. As shown in FIG. 3, the connection points A, B, and C on the pin 31 correspond to the connection points A, B, and C of FIG. 1(a), and can be used after being connected properly.

Figure 4:
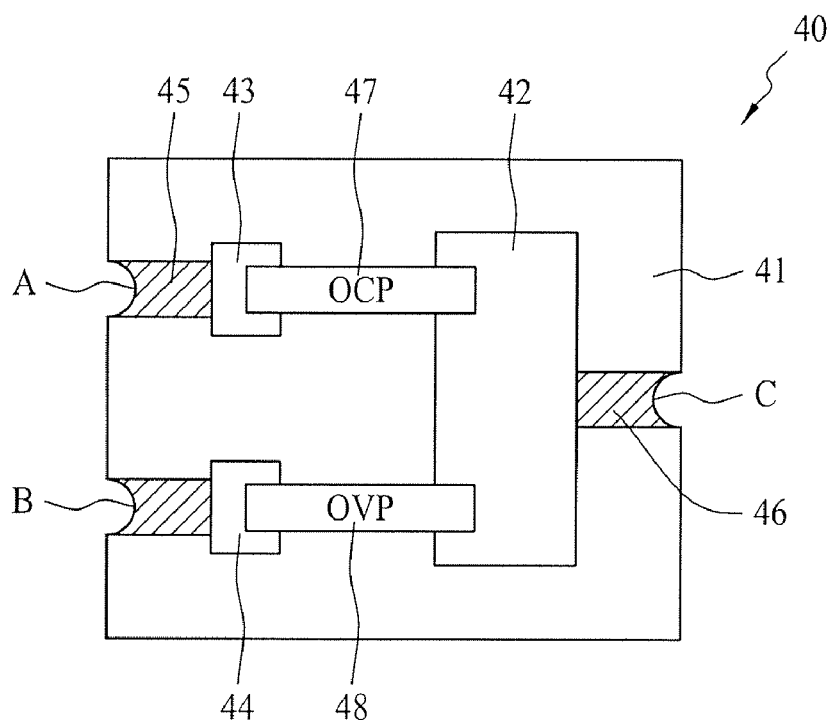
FIGS. 4-7(c) show over-current and over-voltage protection assembly apparatuses in accordance with other embodiments of the present invention.

FIG. 4 illustrates an over-current and over-voltage protection assembly apparatus fabricated with an SMD technique, and is a top view of an over-current and over-voltage protection assembly apparatus 40 with electrodes disposed on its left and right sides. An OCP device 47 and an OVP device 48 are disposed on a substrate 41. One end of the OCP device 47 and one end of the OVP device 48 are both connected to a bonding pad 42, and the other end of the OCP device 47 and the other end of the OVP device 48 are connected to bonding pads 43 and 44 respectively. The substrate 41 can be a PCB substrate (glass fiber substrate), a ceramic substrate (e.g., aluminum oxide substrate), or a plastic substrate. The bonding pads 43 and 44 are electrically connected to conductive vias, which correspond to the positions A and B of FIG. 1(a), on the left side through conductive channels 45. The bonding pad 42 is electrically connected to a conductive via on the right side through a conductive channel 46, i.e., corresponding to the position C of FIG. 1(a). The conductive vias A, B, and C can be in the form of circular holes or semi-circular holes.

Figure 5:
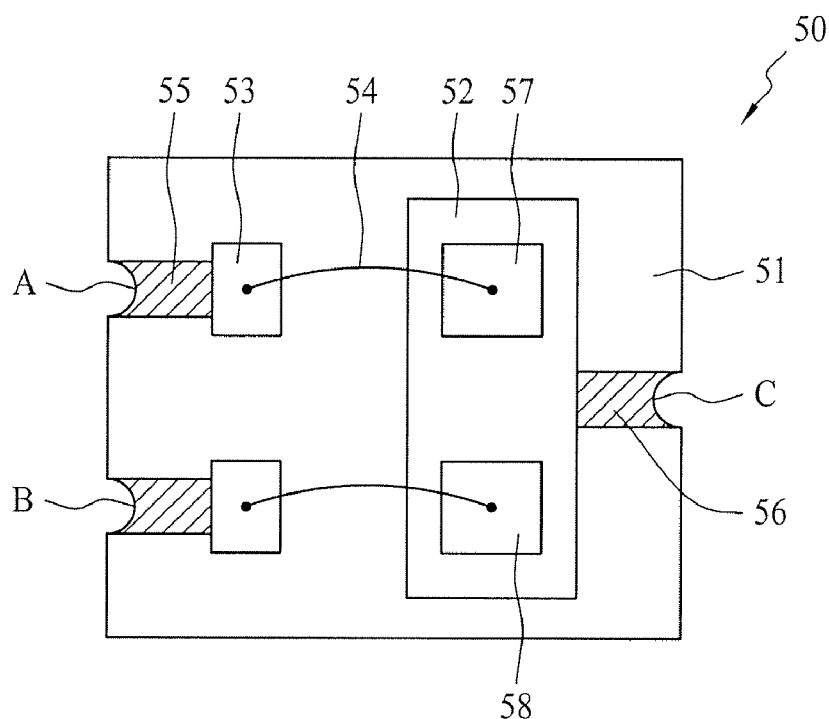

FIG. 5 is a top view of an over-current and over-voltage protection assembly apparatus 50. The apparatus 50 is in the form of a chip, i.e., with the electrodes disposed on its upper and lower sides. An OCP device 57 and an OVP device 58 are disposed on a bonding pad 52 on the surface of a substrate 51, and are connected to bonding pads 53 through bonding wires 54. The bonding pads 53 are electrically connected to conductive vias, which correspond to the connection points A and B of FIG. 1(a), on the left side through conductive channels 55. The bonding pad 52 is electrically connected to a conductive via, which corresponds to the connection point C of FIG. 1(a), on the right side through a conductive channel 56. The conductive vias A, B, and C can be in the form of circular holes or semi-circular holes.

Figure 6A:
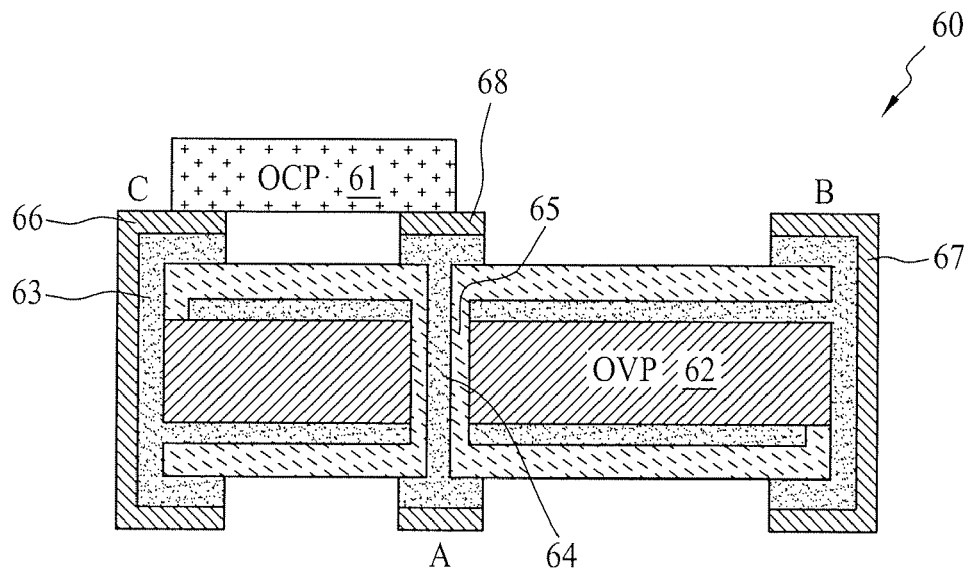
Figure 6B:
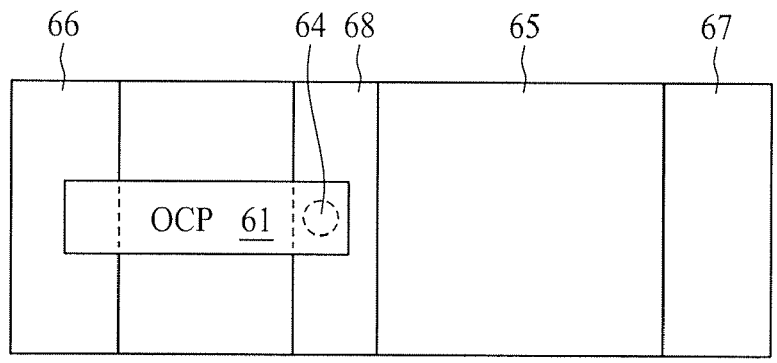
Figure 6C:
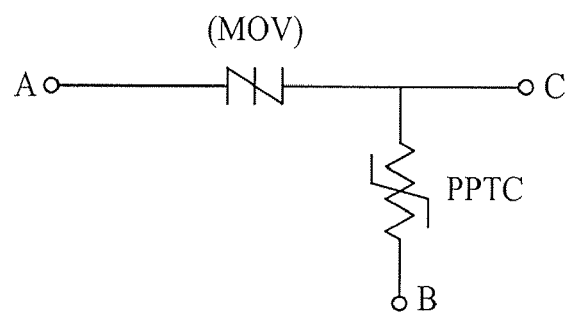

FIGS. 6(a)-6(c) show an over-current and over-voltage protection assembly apparatus 60 according to another embodiment. FIG. 6(b) is a top view of FIG. 6(a), and FIG. 6(c) is a schematic circuit diagram of the over-current and over-voltage protection assembly apparatus 60. Upper and lower sides of an OVP device 62 (e.g., a varistor MOV) are connected to electrodes 66 and 67 on the left and right sides, respectively, through conductive layers 63, so as to form a conductive path for serially connecting the OVP device 62 to the points B and C. A conductive via 64 penetrates through the OVP device 62, and an insulating layer 65 is coated around the conductive via 64 so as to electrically insulate the conductive via 64 from the OVP device 62. An OCP device (e.g., a PPTC device) 61 spans across the left electrode 66 and a middle electrode 68 disposed above the conductive via 64, so as to form a conductive path for serially connecting the OCP device 61 to the points A and C. Thus, the OVP device 62 and the OCP device 61 are connected in parallel, and the point C is a common point.

Figure 7A:
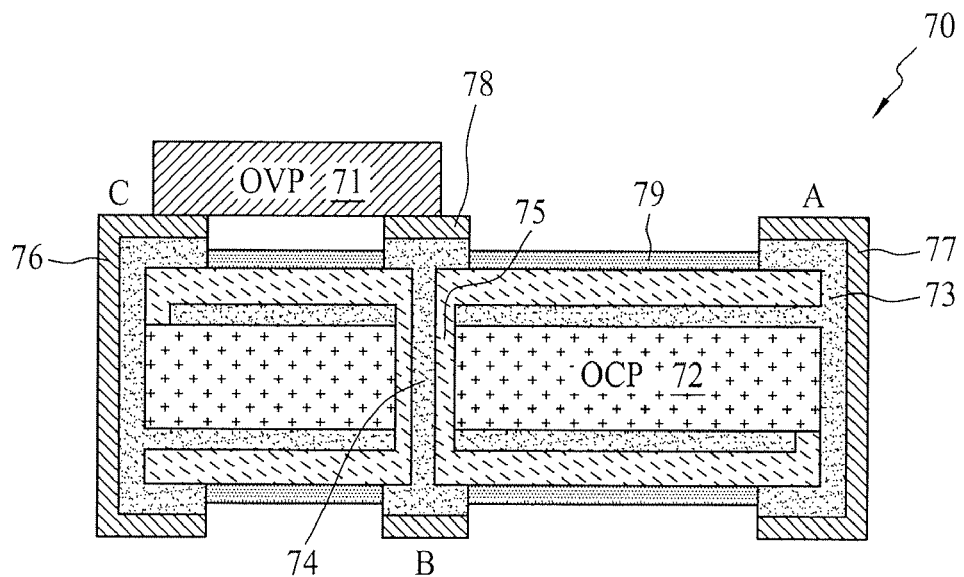
Figure 7B:
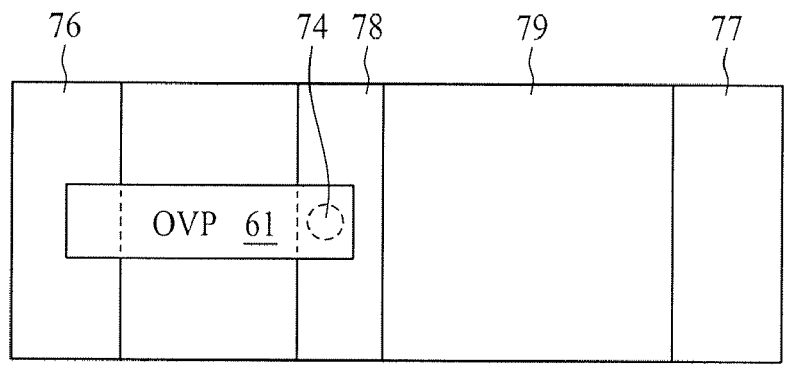
Figure 7C:
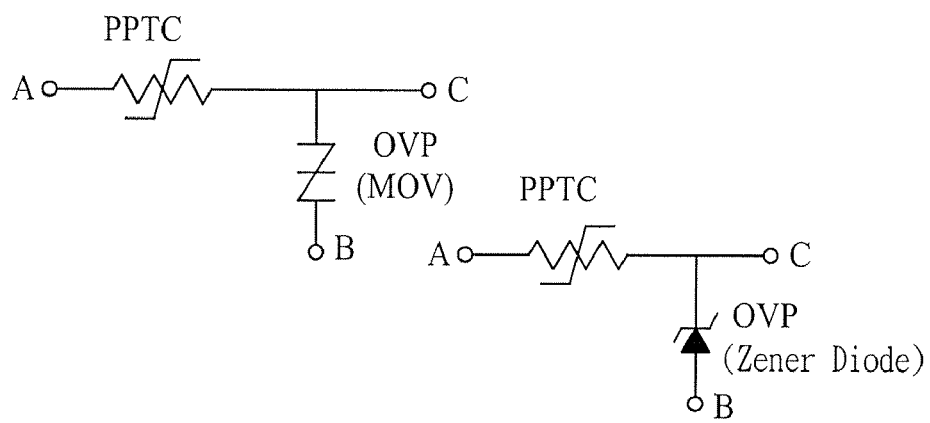

FIGS. 7(a)-7(c) show an over-current and over-voltage protection assembly apparatus 70 according to another embodiment. FIG. 7(b) is a top view of FIG. 7(a), and FIG. 7(c) is a schematic circuit diagram of the over-current and over-voltage protection assembly apparatus 70. The upper and lower sides of an OCP device 72 (e.g., a PPTC device) are connected to electrodes 76 and 77 on the left and right sides, respectively, through a conductive layer 73, so as to form a conductive path for serially connecting the OCP device 72 between the points A and C. A conductive via 74 penetrates through the OCP device 72, and an insulating layer 75 is coated around the conductive via 74 to electrically isolate the conductive via 74 from the OCP device 72. An OVP device (e.g., a varistor MOV or a Zener diode) 71 spans across the left electrode 76 and a middle electrode 78 disposed above the conductive via 74, so as to form a conductive path for serially connecting the OVP device 71 to the points B and C. Thus, the OCP device 72 and the OVP device 71 are connected in parallel, and the point C is a common point. A solder mask 79 is overlaid on the surface of insulating layer 75 on the upper and lower sides of the OCP device 72.

Table 1 shows a comparison of characteristics of the over-current and over-voltage protection assembly apparatus of the present invention and those of the prior arts.

TABLE 1

| Characteristics | The Present Invention | Analog IC Form | Integrating OCP and OVP Devices |
|---|---|---|---|
| Primary or Secondary Protection | Primary/Secondary | Primary/Secondary | Secondary |
| Power Endurance | High | Low | High |
| Response Time | Fast | Fast | Medium |
| Process | Simple | Complicated | Simple |
| Cost | Low | High | Medium |
| Device Size | Small | Small | Large |

As shown in Table 1, the over-current and over-voltage protection assembly apparatus of the present invention has the advantages of high power resistance, quick response time, simple process, low cost, and small volume, and is quite suitable for telecommunications devices.

The above-described embodiments of the present invention are intended to be illustrative only. Numerous alternative embodiments may be devised by those skilled in the art without departing from the scope of the following claims.

What is claimed is:

1. An over-current and over-voltage protection assembly apparatus, comprising:
   an over-current protection (OCP) device with a first end electrically connected to a first connection point and a second end electrically connected to a second connection point;
   an over-voltage protection (OVP) device with a first end electrically connected to a third connection point and a second end electrically connected to the second connection point, the second connection point being a common point of the OCP device and the OVP device;
   wherein the OCP device and the OVP device are integrated as an assembly, the first, second and third connection points are connected to a circuit to be protected, and the OCP device is connected in series to the circuit to be protected, and the OVP device is connected in parallel to the circuit to be protected;

wherein the first end of the OCP device is connected to a first bonding pad, the first end of the OVP device is connected to a second bonding pad, the second end of the OCP device and the second end of the OVP device are each connected to a third bonding pad, and the first, second, and third bonding pads are electrically connected to the first, third, and second connection points, respectively;

wherein the OCP and OVP devices and the first, second, third bonding pads are disposed on a substrate;

wherein the OCP and OVP devices are separately disposed on a surface of the third bonding pad.

2. The over-current and over-voltage protection assembly apparatus of claim 1, wherein the assembly apparatus is in the form of a surface mount device (SMD).

3. The over-current and over-voltage protection assembly apparatus of claim 1, wherein the first, second, and third connection points are circular or semi-circular conductive vias.

4. The over-current and over-voltage protection assembly apparatus of claim 1, wherein the OCP device is a polymeric positive temperature coefficient device.

5. The over-current and over-voltage protection assembly apparatus of claim 1, wherein the OVP device is a Zener diode or a varistor.

6. An over-current and over-voltage protection assembly apparatus comprising:

an over-current protection (OCP) device with a first end electrically connected to a first connection point and a second end electrically connected to a second connection point;

an over-voltage protection (OVP) device with a first end electrically connected to a third connection point and a second end electrically connected to the second connection point, the second connection point being a common point of the OCP device and the OVP device;

wherein the OCP device and the OVP device are integrated as an assembly, the first, second and third connection points are connected to a circuit to be protected, and the OCP device is connected in series to the circuit to be protected, and the OVP device is connected in parallel to the circuit to be protected;

wherein the OCP device and the OVP device are respectively connected to a first bonding pad and a second bonding pad through at least one bonding wire, the OCP device and the OVP device are separately disposed on a surface of a third bonding pad, and the first, second, and third bonding pads are electrically connected to the first, third, and second connection points, respectively;

wherein the OCP and OVP devices and the first, second, third bonding pads are disposed on a substrate.

7. The over-current and over-voltage protection assembly apparatus of claim 6, wherein the assembly apparatus is in the form of a surface mount device (SMD).

8. The over-current and over-voltage protection assembly apparatus of claim 6, wherein the first, second, and third connection points are circular or semi-circular conductive vias.

9. The over-current and over-voltage protection assembly apparatus of claim 6, wherein the OCP device is a polymeric positive temperature coefficient device.

10. The over-current and over-voltage protection assembly apparatus of claim 6, wherein the OVP device is a Zener diode or a varistor.

11. An over-current and over-voltage protection assembly apparatus comprising:

an over-current protection (OCP) device with a first end electrically connected to a first connection point and a second end electrically connected to a second connection point;

an over-voltage protection (OVP) device with a first end electrically connected to a third connection point and a second end electrically connected to the second connection point, the second connection point being a common point of the OCP device and the OVP device;

wherein the OCP device and the OVP device are integrated as an assembly, the first, second and third connection points are connected to a circuit to be protected, and the OCP device is connected in series to the circuit to be protected, and the OVP device is connected in parallel to the circuit to be protected;

wherein an upper side of the OVP device is connected to a left electrode through conductive layers and a lower side of the OVP device is connected to a right electrode through conductive layers, a conductive via penetrates through a center of the OVP device, an insulating layer is coated around the conductive via to electrically insulate the conductive via from the OVP device, and the OCP device spans across the left electrode and a middle electrode disposed above the conductive via;

wherein the left electrode spanned by the OCP device acts as the second connection point, a bottom of conductive via acts as the first connection point, and the right electrode acts as the third connection point.

12. The over-current and over-voltage protection assembly apparatus of claim 11, wherein the insulating layer is disposed on a surface of the upper side and a surface of the lower side of the OVP device, and is coated with a solder mask.

13. The over-current and over-voltage protection assembly apparatus of claim 11, wherein the OCP device is a polymeric positive temperature coefficient device.

14. The over-current and over-voltage protection assembly apparatus of claim 11, wherein the OVP device is a Zener diode or a varistor.

15. An over-current and over-voltage protection assembly apparatus comprising:

an over-current protection (OCP) device with a first end electrically connected to a first connection point and a second end electrically connected to a second connection point;

an over-voltage protection (OVP) device with a first end electrically connected to a third connection point and a second end electrically connected to the second connection point, the second connection point being a common point of the OCP device and the OVP device;

wherein the OCP device and the OVP device are integrated as an assembly, the first, second and third connection points are connected to a circuit to be protected, and the OCP device is connected in series to the circuit to be protected, and the OVP device is connected in parallel to the circuit to be protected;

wherein an upper side of the OCP device is connected to a left electrode through conductive layers and a lower side of the OCP device is connected to a right electrode through conductive layers, a conductive via penetrates through a center of the OCP device, an insulating layer is coated around the conductive via to electrically insulate the conductive via from the OCP device, and the OVP device spans across the left electrode and a middle electrode disposed above the conductive via;

wherein the left electrode spanned by the OVP device acts as the second connection point, a bottom of conductive via acts as the third connection point, and the right electrode acts as the first connection point.

16. The over-current and over-voltage protection assembly apparatus of claim 15, wherein the insulating layer is disposed on a surface of the upper side and a surface of the lower side of the OCP device, and is coated with a solder mask.

17. The over-current and over-voltage protection assembly apparatus of claim 15, wherein the OCP device is a polymeric positive temperature coefficient device.

18. The over-current and over-voltage protection assembly apparatus of claim 15, wherein the OVP device is a Zener diode or a varistor.

19. The over-current and over-voltage protection assembly apparatus of claim 1, wherein the OCP device acts as a bridge to connect the first bonding pad and the third bonding pad.

20. The over-current and over-voltage protection assembly apparatus of claim 1, wherein the OVP device acts as a bridge to connect the second bonding pad and the third bonding pad.

* * * * *